(12) United States Patent
Davidson et al.

(10) Patent No.: US 8,920,615 B2
(45) Date of Patent: Dec. 30, 2014

(54) SALT WATER CHLORINATOR

(75) Inventors: Robert Bruce Davidson, Cambridge (GB); Mark Andrew Lance, Williamstown (AU)

(73) Assignee: Davey Water Products Pty Ltd, Scoresby, Victoria (AU)

( * ) Notice: Subject to any disclaimer, the term of this patent is extended or adjusted under 35 U.S.C. 154(b) by 309 days.

(21) Appl. No.: 13/496,075

(22) PCT Filed: Sep. 16, 2010

(86) PCT No.: PCT/AU2010/001202
§ 371 (c)(1),
(2), (4) Date: May 11, 2012

(87) PCT Pub. No.: WO2011/032212
PCT Pub. Date: Mar. 24, 2011

(65) Prior Publication Data
US 2012/0234673 A1    Sep. 20, 2012

(30) Foreign Application Priority Data

Sep. 16, 2009 (AU) .................... 2009904495
May 26, 2010 (AU) .................... 2010902315

(51) Int. Cl.
| C02F 1/461 | (2006.01) |
| C02F 1/46 | (2006.01) |
| C02F 1/467 | (2006.01) |
| C02F 103/42 | (2006.01) |

(52) U.S. Cl.
CPC ............ C02F 1/4602 (2013.01); C02F 1/4674 (2013.01); *C02F 1/46104* (2013.01); *C02F 2001/46119* (2013.01); *C02F 2103/42* (2013.01); *C02F 2209/40* (2013.01)
USPC .................. 204/242; 205/742; 210/748.2

(58) Field of Classification Search
CPC ............ C25B 1/24; C25B 1/26; C25B 1/265; C25B 1/34; C25B 9/00; C25B 15/00; C25B 15/02; C25B 15/06; C25B 15/04; C02F 1/461; C02F 1/46104; C02F 1/467; C02F 1/4672; C02F 1/4674; C02F 1/46; C02F 2001/46119

USPC .............. 204/242; 205/742–761, 474, 556; 210/748.17, 748.2
See application file for complete search history.

(56) References Cited

U.S. PATENT DOCUMENTS 3,415,726 A * 12/1968 Roller ........................ 205/341
3,432,420 A    3/1969 Pan
(Continued)

FOREIGN PATENT DOCUMENTS

DE    32 03 090 A1    8/1983
GB      730057 A       5/1955
(Continued)

OTHER PUBLICATIONS

International Search Report from the Australian Patent Office in International Application No. PCT/AU2010/001202 mailed Oct. 25, 2010.
(Continued)

*Primary Examiner* — Harry D Wilkins, III
*Assistant Examiner* — Ciel Thomas
(74) *Attorney, Agent, or Firm* — Finnegan, Henderson, Farabow, Garrett & Dunner LLP (57) ABSTRACT

A salt water chlorinator (30) for a swimming pool includes an electrolysis cell having two anodes (98) and a cathode (94). Two scrapers (102), each of which is of titanium and includes scraping portions in the form of ribs (106) in contact with the opposite surfaces of the cathode, are reciprocated relative to the cathode (94) to remove scale deposits from the cathode (94). The scrapers (102) are mounted in a frame (110) and their scraping ribs (106) are curved such that the ribs (106) are self-biased against the cathode surfaces. A mechanism for reciprocating the scrapers (102) includes two solenoid coils (116) which act on cores (114) in a stem (112) of the frame (110). A control circuit for the electrolysis cell is contained in a housing (86) which is attached to a housing (82) for the electrolysis cell. The control circuit includes a flow sensor for sensing salt-water flow through the electrolysis cell.

22 Claims, 9 Drawing Sheets

(56) References Cited

U.S. PATENT DOCUMENTS

| | | | |
|---|---|---|---|
| 3,822,017 A * | 7/1974 | Rast | 210/145 |
| 3,825,484 A * | 7/1974 | Fronsman | 204/216 |
| 3,960,695 A | 6/1976 | Roller | |
| 4,565,613 A * | 1/1986 | Schoberle et al. | 205/527 |
| 4,668,369 A | 5/1987 | King | |
| 5,792,328 A | 8/1998 | Givon | |
| 5,977,678 A * | 11/1999 | Miller et al. | 310/103 |
| 6,007,693 A | 12/1999 | Silveri | |
| 6,214,182 B1 * | 4/2001 | Ritter | 204/273 |
| 7,374,656 B2 | 5/2008 | Elgressy | |
| 7,695,613 B2 * | 4/2010 | Doyle et al. | 210/85 |
| 2005/0000797 A1 * | 1/2005 | Smith et al. | 204/227 |
| 2005/0173242 A1 * | 8/2005 | Elgressy | 204/229.4 |

FOREIGN PATENT DOCUMENTS

| | | |
|---|---|---|
| GB | 847674 A | 9/1960 |
| JP | 60-002688 A | 1/1985 |
| JP | 6-158359 A | 6/1994 |

OTHER PUBLICATIONS

International Preliminary Report on Patentability from the Australian Patent Office in International Application No. PCT/AU2010/001202 dated Mar. 20, 2012.

Communication from the European Patent Office in European Application No. 10816470.8 dated Sep. 12, 2013.

* cited by examiner

FIG 9

SALT WATER CHLORINATOR

TECHNICAL FIELD

The present invention relates to a salt water chlorinator. A primary application for the invention is for conditioning the water in a swimming pool, however other applications are possible where a body of salt water requires conditioning by an oxidizing agent to kill bacteria and algae, for example spa pools, fountains and evaporative air conditioning installations.

BACKGROUND

A reference herein to a patent document or other matter which is given as prior art is not to be taken as an admission that that document or matter was, in Australia, known or that the information it contains was part of a common general knowledge as at the priority date of any of the claims.

Salt water chlorinators of the type with which the invention is concerned include an electrolysis cell to electrolyse chloride salts in the water to generate chlorine at an anode of the electrolysis cell. The chlorine reacts with a hydroxide (that is, sodium hydroxide NaOH) in the water (which, along with hydrogen gas is produced at the cathode) to form hypochlorite ions (from mainly sodium hypochlorite—NaOCl) as the primary sterilizing agent.

A problem with such electro-chlorinators is that scale (principally calcium salts) deposits and builds up on the cathode, thus reducing the efficiency of chlorine production by the cell. This problem has been addressed by periodically cleaning the cell, either manually by removing it from the chlorination system and soaking/scrubbing the electrodes in acid, or automatically by the system including means for injecting a dose of cleaning acid into the cell which remains in the cell for a predetermined time before being pumped out and into the body of salt water. Both the manual and automatic cleaning methods, apart from other problems, require consumers to handle acid which is generally not acceptable to consumers.

Another method for reducing the problem of scale build up has been to periodically reverse the polarity of the electrodes. However this requires more complex and thus more expensive control circuitry, and coatings have to be provided on all the electrodes. It also tends to shorten the lifespan of electrodes.

United States patents U.S. Pat. No. 3,432,420 (Pei-Tai Pan), U.S. Pat. No. 3,822,017 (W. Rast) and U.S. Pat. No. 4,668,369 (A. S. King) disclose use of mechanically driven scrapers within an electrolysis cell to remove deposits from a cathode. The applicant, however, is not aware of any such arrangements currently on the market and assumes that arrangements as exemplified by these US patents have not been effective, either operationally or for reasons of high manufacturing costs.

The present invention addresses the problem of scale build up on the cathode in a manner which reduces the disadvantages of the above described prior cleaning methods.

DISCLOSURE OF THE INVENTION

According to the present invention there is provided a salt water chlorinator (e.g. for a swimming pool), including an electrolysis cell containing an anode and a cathode and a scraper that is moveable relative to the cathode to remove deposits of electrolysis products from a surface of the cathode, wherein the scraper includes scraping portions which are positioned and configured to be self biased against the surface of the cathode.

Thus the invention provides a mechanical solution to the problem of removal of scale from the cathode. That is, the scale is physically scraped off the surface of the cathode. Preferably the scraping portions of the scraper are formed from a resilient material and have a curved configuration, and the scraper is maintained in a position relative to the surface of the cathode such that the scraping portions resiliently contact that surface due to their curvature.

The cathode may be a plate electrode and preferably the scraper comprises opposite sides, wherein the scraping portions are in the form of ribs which extend between the opposite sides transversely across the cathode surface. Such ribs, being resilient and curved, are effectively leaf-springs. The ribs may increase in width from one said opposite side to their centres and then decrease in width from their centres to the other said opposite side such that each rib resiliently contacts the cathode surface with substantially equal pressure along the length of the rib.

The salt water chlorinator preferably includes two scrapers, each for removing deposits of electrolysis products from a respective opposite surface of the cathode. Each scraper includes scraping portions which are positioned and configured as described above. Preferably each scraper is made from titanium, which is a metal having sufficient resilience and ductility for the ribs to conform to the cathode surfaces and contact them with sufficient force to scrape away the scale. This metal is also highly resistant to the corrosive environment that exists within an electrolysis cell. Alternatively the scrapers could be made from another suitable material, for example a plastic impregnated with glass fibres to provide increased surface friction to assist in scale removal.

In embodiments where the cathode of the salt water chlorinator is a plate electrode the scrapers may be substantially coextensive in peripheral outline with the cathode. Also the scrapers are constructed to minimise "shading" of the cathode surface by the scraper. This is achieved by minimising the profile of the scrapers at right angles to the main surfaces of the cathode and anode plates. Areas of the cathode shaded by the scrapers may not produce chlorine and thus by minimising the shading of the cathode surfaces by the scrapers, chlorine production is maximised. Thus the or each scraper preferably has a mesh structure as above described (that is, a structure having opposite sides between which the scraping portions, being ribs, extend) such that shading of the adjacent cathode surfaces is minimised.

Preferably a frame, which may be made from a plastics material, is provided for mounting and positioning the scrapers relative to the cathode. Such a frame with the scrapers mounted therein, allows for the cathode plate to be located between the scrapers and to be held therebetween by the resilient ribs. That is, the frame provides a means for mounting the scrapers for their scraping portions to be positioned such that due to their configuration (that is, curved ribs) they are self-biased (by virtue of the resilience and curvature of the ribs) against the adjacent cathode surfaces.

A mechanism in the salt water chlorinator for relatively moving the scrapers and cathode is such that preferably the scrapers and the cathode are relatively reciprocally moveable and more preferably such mechanism is operable to reciprocate the scrapers. However the invention is intended to encompass arrangements where the cathode instead of the scrapers is moved, or where both are moved.

The mechanism for relatively moving the scrapers and the cathode may include any suitable means, either mechanical or electrical or both, and may for example be or include a solenoid. Preferably a solenoid is provided which is operable to reciprocate the scrapers.

A housing for the salt water chlorinator preferably defines a first chamber and a second chamber. In this embodiment the first chamber provides the electrolysis cell, and the second chamber contains a solenoid which is a component of a mechanism for reciprocating the scrapers or cathode. A moveable core for the solenoid is located within the first chamber and is attached to the scrapers, for example via the above described frame, or the cathode. Electrical current supplied to the solenoid is operable to generate a magnetic field to move the core into the solenoid for reciprocating the scrapers or the cathode.

In order to reciprocate the scrapers (or the cathode if alternatively the cathode is reciprocated), the solenoid may comprise two axially arranged solenoid coils and a moveable core for each coil is provided attached to the scrapers (or cathode). By alternately activating the solenoid coils one or the other core is magnetically acted upon and drawn into its associated coil to reciprocate the scrapers (or the cathode). Alternatively a single solenoid coil may be provided to draw the moveable core into it and means may be provided for repelling the moveable core after it is moved into the solenoid. Such means for repelling the core may be a permanent magnet or return spring.

In an embodiment that includes a housing in which the housing defines two chambers, a control circuit for the electrolysis cell is contained in the second chamber. The control circuit may include a flow sensor for sensing a flow of salt water through the electrolysis cell. This flow sensor can be operative to cause electrical power to the electrolysis cell to be switched off when there is no salt water flow through the cell or if the flow rate does not exceed a predetermined minimum value. Thus this embodiment of the invention places a flow sensor within the housing to sense flow/no flow conditions in the electrolysis cell, in contrast for example to an exteriorly located flow sensor in the piping to the electrolysis cell. Thus the flow sensor is located at the very location at which a safety problem may arise, for example if flow through the electrolysis cell ceases but electrical power continues to be supplied to the electrodes of the electrolysis cell, gases may be generated and contained in the electrolysis cell, and the pressure may increase sufficiently to cause an explosion if the electrolysis cell is isolated, for example if it has inlet and outlet valves which are closed. With this embodiment of the invention, when the flow through the electrolysis cell ceases, this is sensed by the flow sensor which, via the control circuit, switches off the power that is supplied to the electrodes of the electrolysis cell. This placement of the flow sensor within the chlorinator avoids a risk associated with a flow sensor that is associated with exteriorly located piping which is that flow could still occur within the piping but may not pass through the electrolysis cell (for example if the piping between the flow sensor and the electrolysis cell breaks). Alternatively, as mentioned above, if the flow rate falls below a predetermined minimum value, the power to the cell could be switched off Also, the salt water chlorinator, comprising principally an electrolysis cell and its control circuit, is provided as a single compact unit (that is, there is a single housing). This provides manufacturing advantages and therefore a less costly solution than many prior art installations where a control circuit and an electrolysis cell are provided as separate units. In this embodiment the housing preferably includes a wall element which divides the housing to provide the two chambers, and the wall element includes a region, which may be thinned compared to the thickness of the wall element, constituting an operative part of the flow sensor.

The flow sensor may include a heater (for example a resistance heater) and two temperature responsive elements (for example thermistors) which are spaced apart, wherein the heater is for transferring heat into the salt water via said region of the wall element and the temperature responsive elements are for detecting differentials in the power required to maintain a first sensor (being one of the temperature responsive elements) adjacent to the heater at a higher temperature compared to a second reference sensor (being the other of the two temperature responsive elements) spaced away from the heater for detecting the presence or absence of a flow of salt water. The flow sensor enhances safety insofar as its immediacy to the actual flow of salt water through the electrolysis cell via said region of the wall element provides for sensing of a no flow condition and thus switching off of the power supply to the electrolysis cell before a damaging build up of pressure can occur.

The region of the wall element constituting an operative part of the flow sensor, which may be thinned, must be sufficiently strong to withstand pressures within the electrolysis cell. Consistent with this requirement, the thickness of the region is minimised (that is, it is thinned) for the heat transfer through it to occur as quickly as possible to minimise delays in the temperature sensing by the temperature responsive elements. This region is an operative part of the flow sensor due to its function in transferring heat from the heater into the salt water and from the salt water to the temperature responsive elements.

Using a region of the wall element, which is possibly thinned, for the flow sensor provides two advantages. Firstly, a suitable polymer for the wall element is more corrosion resistant than alternative wall element materials such as metal, and secondly, there is no potential leak path between the control chamber and the chlorination chamber, thereby increasing reliability of the unit.

Preferably the reference temperature responsive element is also utilised for temperature detection within the electrolysis cell and componentry of the control circuit provides for temperature measurement. Such temperature detection and measurement componentry may be operative to adjust power supply to the electrolysis cell and thus chlorine production dependent upon detected temperatures, for example, production of chlorine at a temperature which is too high or too low could damage the electrolysis cell—thus temperature detection is used to stop or reduce chlorine production if the detected temperature is at a possibly damaging value, being either too high or too low. Temperature detection can also be used between these limits to vary the output power of the cell to optimise chlorine production and maximise cell life.

Conductivity within the electrolysis cell may also be measured (as more fully described below) and the temperature measurement may be used to "correct" the conductivity measurement. That is, the conductivity measurement (for estimating the salt concentration) is affected by the temperature within the cell and thus conductivity values are determined relative to a fixed reference temperature. Thus the actual measured temperature is used to adjust the actual measured conductivity (according to a predetermined algorithm) to give a corrected conductivity value which is a value relative to the fixed reference temperature. Thus, preferably the control circuit of the electrolysis cell functionally allows or includes componentry for measuring electrical conductivity between the anodes to produce a benchmark conductivity reading. Depending upon electrical conductivity measurements between the chlorination cathode and anode compared with the benchmark conductivity reading, the scrapers may be caused to operate for the cathode to be cleaned when an electrical conductivity measurement varies from the benchmark conductivity reading by a predetermined threshold value.

Alternatively, the scrapers may be activated according to a time based schedule.

For a better understanding of the invention and to show how the same may be performed, preferred embodiments thereof will now be described, by way of non-limiting example only, with reference to the accompanying drawings.

BRIEF DESCRIPTION OF DRAWINGS

FIGS. 11 and 12 are longitudinal cross sections of another salt water chlorinator according to an embodiment of the invention, wherein FIG. 11 illustrates a non-operated position for the scrapers and FIG. 12 illustrates an operated position for the scrapers.

DETAILED DESCRIPTION

Figure 1:
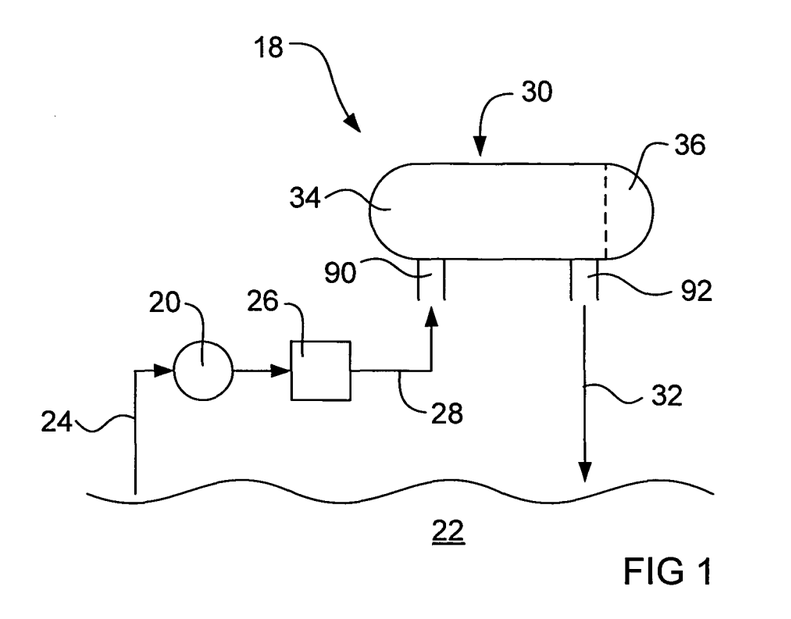
FIG. 1 schematically illustrates a simple chlorinator installation for a domestic swimming pool.

With reference to FIG. 1, a chlorinator installation 18 for a domestic swimming pool includes a circulation pump 20 for pumping the pool water 22 from the pool via suction piping 24 through a filter 26 from which it passes through piping 28 to an inlet 90 of an electrolysis cell 34 of a chlorinator 30 and returns to the pool from the outlet 92 of the electrolysis cell 34 via return piping 32.

The chlorinator 30, which is an embodiment of the subject of the present invention, comprises a compact structure of the electrolysis cell 34 and an adjacently located controller 36 (that is, a control circuit) within the same housing.

The control circuit 36 (see FIG. 2) receives an input power supply 42, for example 240 volts AC and provides at least basic functions of a power supply 44 to the circulation pump 20, a DC power supply 46 to the electrodes of the electrolysis cell 34, and a power supply 48 to operate a cleaning function of the electrolysis cell (to be described below). Control inputs to the control circuit 36 include at least, a salt water flow or no flow signal 50 from a flow sensor which is structurally a part of the control circuit 36 and the electrolysis cell 34 (as will be described below), a temperature signal 52 from a temperature sensor which is also structurally a part of the control circuit 36 and the electrolysis cell 34 (as will also be described below), a signal 54 from a pH probe within the electrolysis cell 34 and a signal 56 from an ORP (oxidation reduction probe) also within the electrolysis cell 34. The ORP probe measures the oxidation reduction potential of whatever oxidiser may be in the water, such as chlorine. It gives an approximate estimation of the chlorine level.

Figure 2:
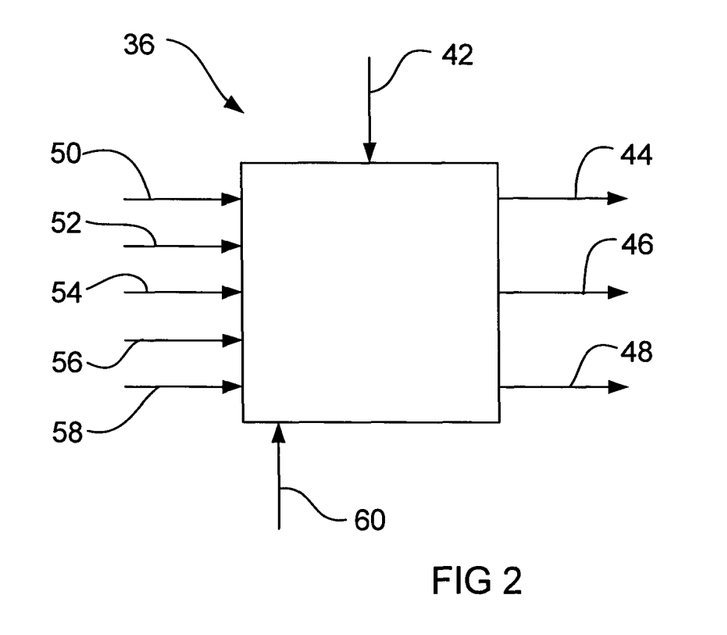
FIG. 2 schematically illustrates basic functions of a controller for a chlorinator of the FIG. 1 installation.

A measurement is also made of the electrical conductivity between the anode and cathode electrodes of the electrolysis cell (when it is not being operated to produce chlorine) as indicated by the signal 58. The conductivity may vary due to a number of factors, including salinity, water temperature and scale build-up on the electrodes.

At set intervals conductivity is also measured between two anode electrodes, when not involved in the chlorination process, to provide a benchmark conductivity reading, and the measurement may be indicated by a signal 60. If reduced conductivity between the anodes and cathode (corrected for temperature variations as described hereinbefore) is evident in a comparison of the benchmark and chlorination electrodes conductivities, it is assumed scale build-up is interfering with electrode (anodes to cathode) conductivity and the cleaning function of the electrolysis cell 34 (described below) is initiated.

In operation of the chlorinator installation 18, control circuit 36 operates the circulation pump 20 to pump salt water through the electrolysis cell 34 wherein it is electrolysed by electricity 46 applied to anodes and a cathode of the electrolysis cell 34. The salt concentration of the pool water 22 should be at least 3,500 ppm (0.35%). If it is any less, it could reduce the lifespan of the chlorinator 30 and insufficient chlorine will be produced to effectively sanitise the pool water 22.

A safety feature of the chlorinator 30 is that when a no flow signal 50 is received, which could be a fault condition if the circulation pump 20 is still operating, the power supply 46 to the electrodes is switched off, and its supply is prevented whilst the no flow condition continues to be sensed. Depending upon the installation 18 (for example whether or not there is a by-pass for the chlorinator 30—not shown) a no flow signal 50 may also be operative to switch off the power 44 to the circulation pump 20. Alternatively the power 44 could be switched off if the flow rate falls below a predetermined minimum value.

The control circuit 36 is responsive to the temperature sensor signal 52 to optimise chlorine production by adjusting the power 46 that is supplied to the electrodes. Chlorine production which is related to the amount of current the electrolysis cell 34 draws is dependent upon the temperature of the salt water and its salt concentration (a lowering of the temperature lessens the current that is drawn, the lower the salt concentration the higher the current demand). As described hereinbefore, temperature and conductivity measurements are made for controlling the operation of the cell 34.

Figure 3:
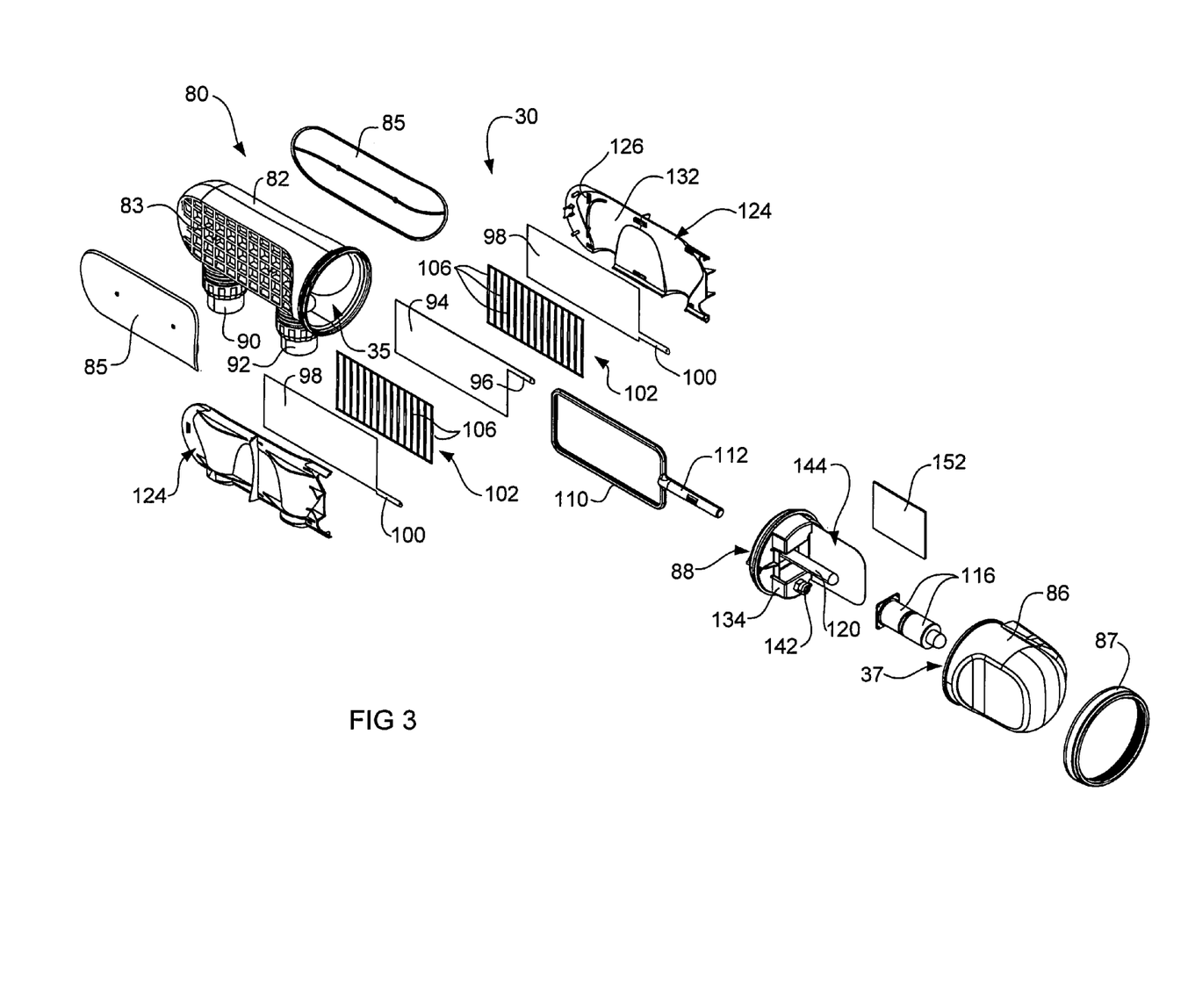
FIG. 3 is an exploded perspective view of a chlorinator according to an embodiment of the present invention.
Figure 4:
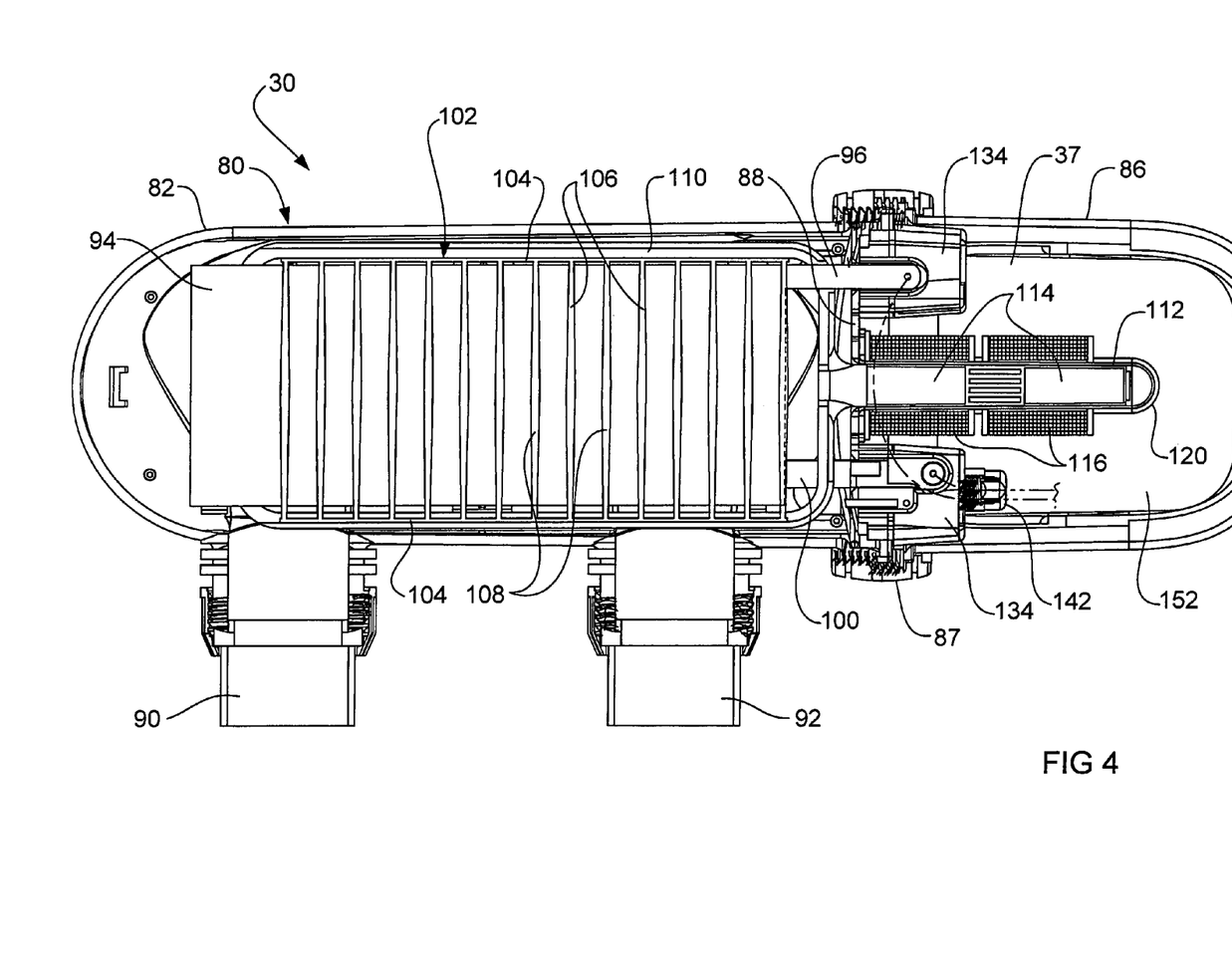
FIG. 4 is a longitudinal cross sectional view of the assembled chlorinator of FIG. 3.

With reference to FIGS. 3 and 4, the chlorinator 30 comprises a housing 80 which is made up of a generally cylindrical main body 82 and an end cap 86. The main body 82 has generally flat sides which are ribbed 83 and over which cover plates 85 are fixed. The flat and ribbed sides 83 are to minimise the internal volume of the electrolysis cell 34 and provide sufficient strength for it to withstand the high internal pressures that will be developed. The internal volume of the housing 80 is divided by a circular wall element 88 at the end of body 82 next to the end cap 86 for the housing 80 to define two chambers, one of which 35 is for the electrolysis cell 34 and the other of which 37 (defined by the end cap 86 and wall element 88) is for the control circuit 36. The wall element 88 is screw threaded for attachment to the main body 82 and the end cap 86 is also screw threaded for attachment to the wall element 88. A locking nut for securing the assembly of the main body 82, wall element 88 and end cap 86 is referenced 87. The body 82 includes an inlet 90 and an outlet 92 for the flow of salt water through the electrolysis cell 34.

The electrodes of the electrolysis cell 34 comprise a central cathode 94 in the form of a rectangular plate that has a tab 96 extending from an upper corner for electrical connection to the cathode, and two anodes 98 which are also rectangular plates that have tabs 100 extending from their lower corners for electrical connection to the anodes. A scraper 102 is located between each surface of the cathode 94 and an anode 98. The two scrapers 102 are rectangular in outline and are substantially coextensive with the cathode 94.

The cathode 94 and two scrapers 102 are both of titanium and given they are in contact, scale will build up on the exposed surfaces of the scrapers 102 as well as the cathode 94 surfaces. Hence the scrapers 102 are constructed to minimise the area of the cathode 94 surfaces which they cover. Thus each scraper 102 has a mesh structure such that coverage of the adjacent cathode surface by the scraper is minimised.

Figure 5:
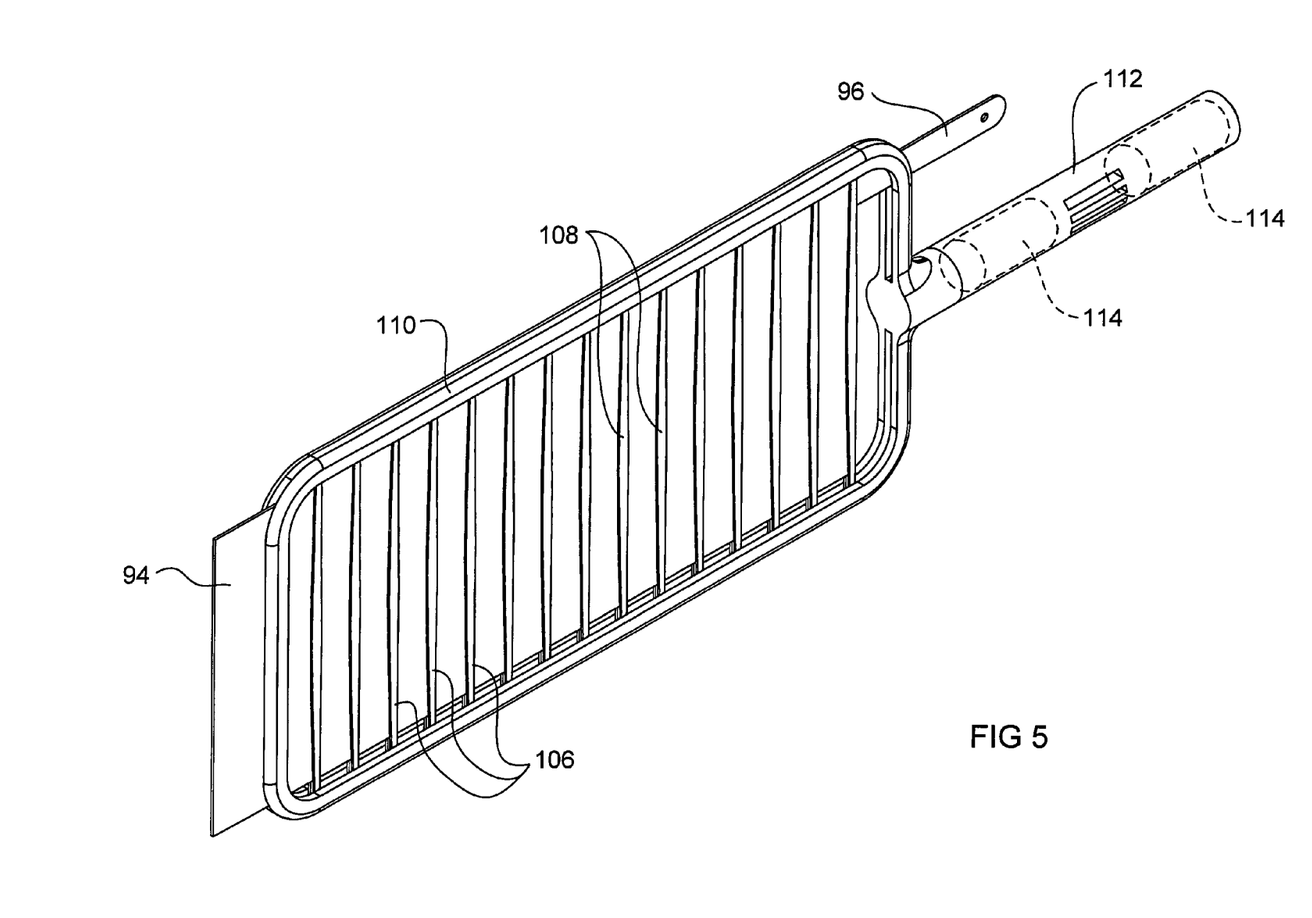
FIG. 5 is a perspective view of components, being a frame with scrapers and a cathode plate, of the chlorinator of FIG. 3.
Figure 6:
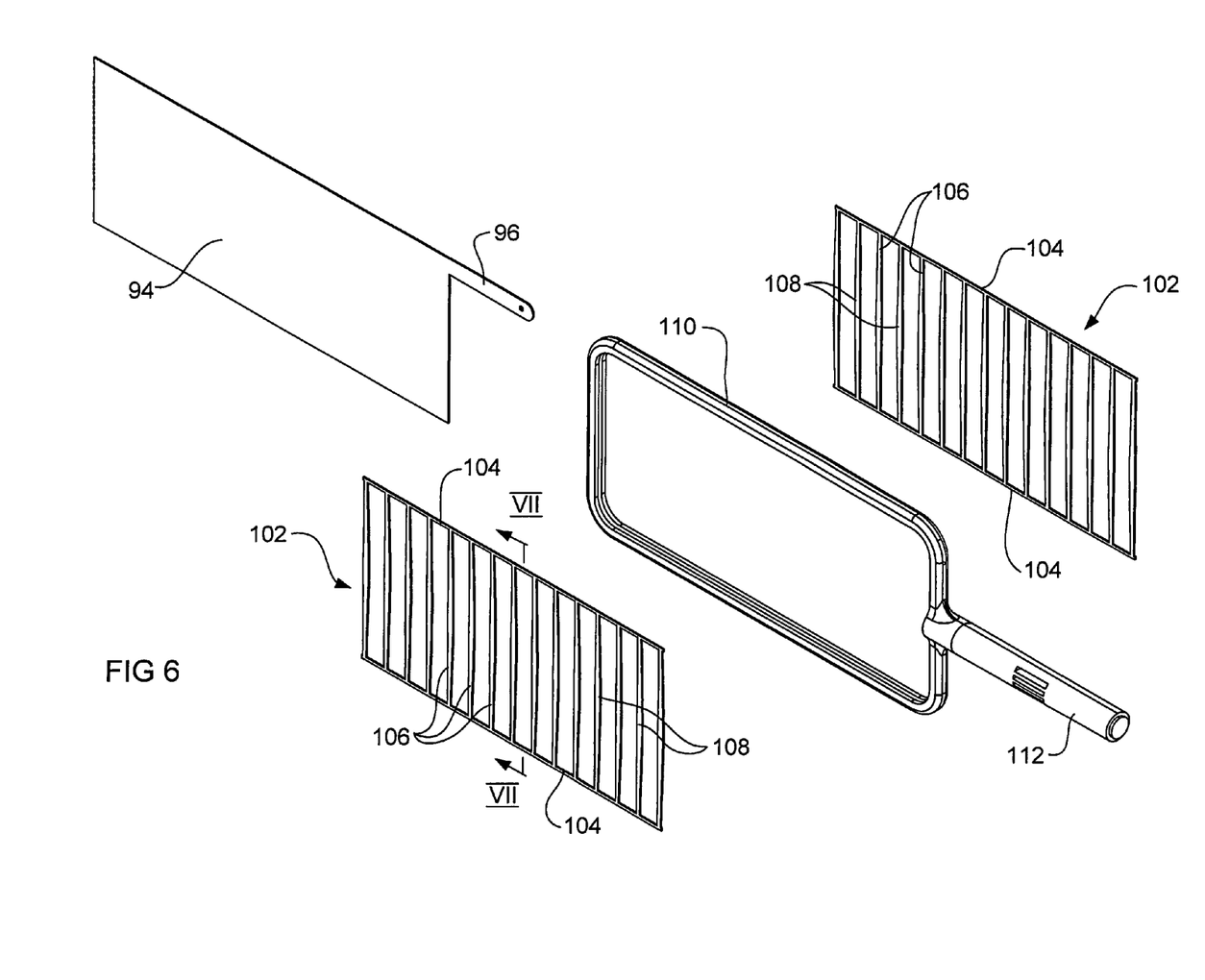
FIG. 6 is an exploded perspective view of the components of FIG. 5.
Figure 7:
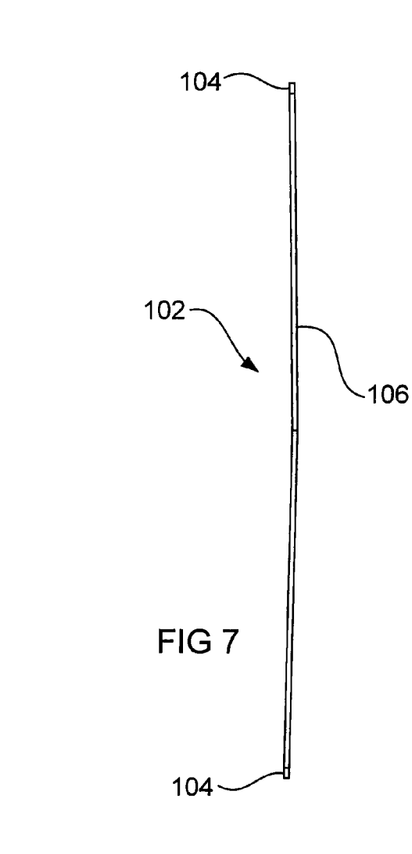
FIG. 7 is a cross section of a scraper along section line VII-VII of FIG. 6.

With reference to FIGS. 6 and 7 each scraper 102 comprises opposite sides 104 between which the scraping portions, which are ribs 106, extend, generally perpendicularly to the sides 104. As best seen in FIG. 7, each rib 106 is of substantially uniform thickness along its length and is curved over its length (in FIG. 7 the curvature is towards the right-hand side). Furthermore, and best seen in FIGS. 4, 5 and 6, the width of each rib 106 smoothly increases from one of the sides 104 to its centre and then decreases in width to the other side 104. Reference 108 indicates the generally central area of maximum width of each rib 106. The scrapers 102 are made from titanium and the resilience of this metal together with the configuration of the ribs 106, that is, their curvature, ensures that the ribs 106 will be self biased against the adjacent cathode surface when the scrapers 102 are mounted in the electrolysis cell 34. Each rib is a leaf spring having a curvature over its length which is such as to ensure that the rib 106 bears against its adjacent cathode surface maximally along the length of the rib. Also the increasing width of each rib 106 from one side 104 towards its centre 108 and then its decrease in width to the other side 104 is to ensure that each rib 106 resiliently contacts the adjacent surface of the cathode 94 with substantially equal pressure over the length of each rib 106. This is to ensure that the whole surfaces of the cathode 94 are effectively scraped. It is possible that other more optimal rib patterns may be adopted. The scraper material may alternatively be plastic, impregnated with glass fibres, providing increased surface friction to assist in scale removal.

Referring now to FIGS. 5 and 6, the scrapers 102 are positioned within a frame 110 having a substantially rectangular configuration to receive the scrapers 102 and the cathode 94 therein. The rectangular frame 110 may be formed from plastic. The frame 110 includes a stem 112 for attachment to means for relatively moving the scrapers 102 and the cathode 94.

FIG. 5 illustrates an assembly of the frame 110 mounting the two scrapers 102 with the cathode plate 94 sandwiched between the curved resilient ribs 106. The means for moving the frame 110 and scrapers 102 assembly relative to the cathode 94 includes two cores 114 of magnetic material, for example steel, located within the stem 112. The cores 114 are operatively associated with two solenoid coils 116 (described below).

Figure 8:
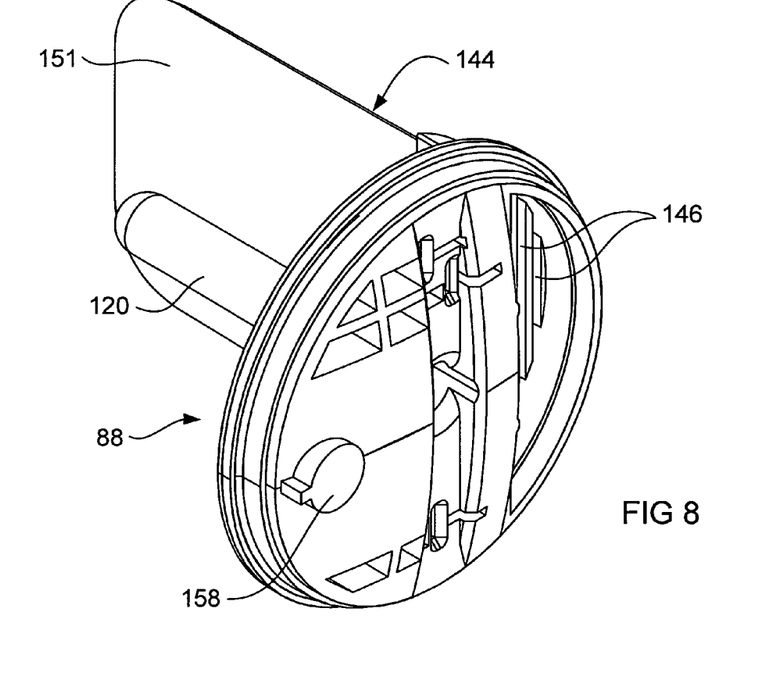
FIGS. 8 and 9 are perspective views from opposite sides of a wall element of the housing of the chlorinator of FIG. 3, with FIG. 8 also illustrating a heat sink attached to the wall element.

The wall element 88 (see also FIGS. 8 to 10) of the housing 80 is shaped to provide a cylindrical extension 120 having a closed end which extends into the second chamber 37 and is open to the chamber 35 of the electrolysis cell 34. The solenoid coils 116 are located on the cylindrical extension 120 and the stem 112 and cores 114 of the frame 110 and scrapers 102 assembly is received in the cylindrical extension 120. Thus the solenoid coils 116 are located in the second chamber 37 and the moveable cores 114 for the solenoids are located within the chamber 35.

Electrical current supplied to one of the solenoid coils 116 attracts one core 114 into the centre of that coil and electrical current supplied to the other coil 116 attracts the other core 114 into the centre of that coil. Thus the coils 116 and cores 114 are appropriately spaced relative to one another such that by alternately activating the coils 116, the frame 110 and scrapers 102 assembly is caused to reciprocate thus moving the ribs 106 over the surfaces of the cathode 94.

Alternatively, the cylindrical extension 120 may contain within it a means for repelling the stem 112 having a single moveable core 114 after it is moved into a single solenoid coil 116. This means could for example be a compression spring or a permanent magnet (not shown).

The chamber 35 of the electrolysis cell 34 contains two mouldings 124 (see FIG. 3) each of which mounts one of the anodes 98. Each moulding 124 includes protrusions 126 which cooperate with complementary recesses (not shown) in the anodes 98 to locate and support the anodes 98 in position within the electrolysis cell 34 of the housing 80. The protrusions 126 may be bayonet type connections for fitting into complementary recesses in the anodes 98.

Additionally, each moulding 124 defines a recess 132 such that together the mouldings 124, together with the main housing body 82, define a passageway for an "easier" flow of salt water 22 through the electrolysis cell 34 from the inlet 90 to the outlet 92, which flow passes over and between the anodes 98 and the cathode 94. Of course, the salt water penetrates elsewhere within the chamber 35. The mesh structure of ribs 106 on the scrapers 102 promote turbulent flow of the salt water 22 over each electrode and allow ionic exchange between the cathode 94 and the anodes 98. As is known, the anodes are coated, for example with an electro-deposited layer of ruthenium. The recesses 132 are also shaped such that any bubbles which may accumulate in their upper regions when the chlorinator 30 is not operating, will be swept away by the pressurised inflow of salt water 22 when the pump 20 is switched on and the electrolysis cell operated.

Figure 9:
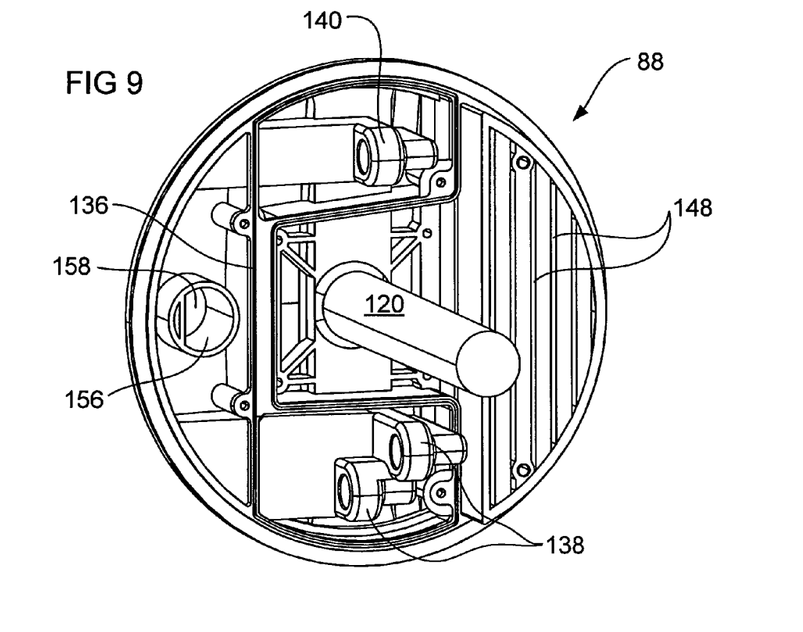
Figure 10:
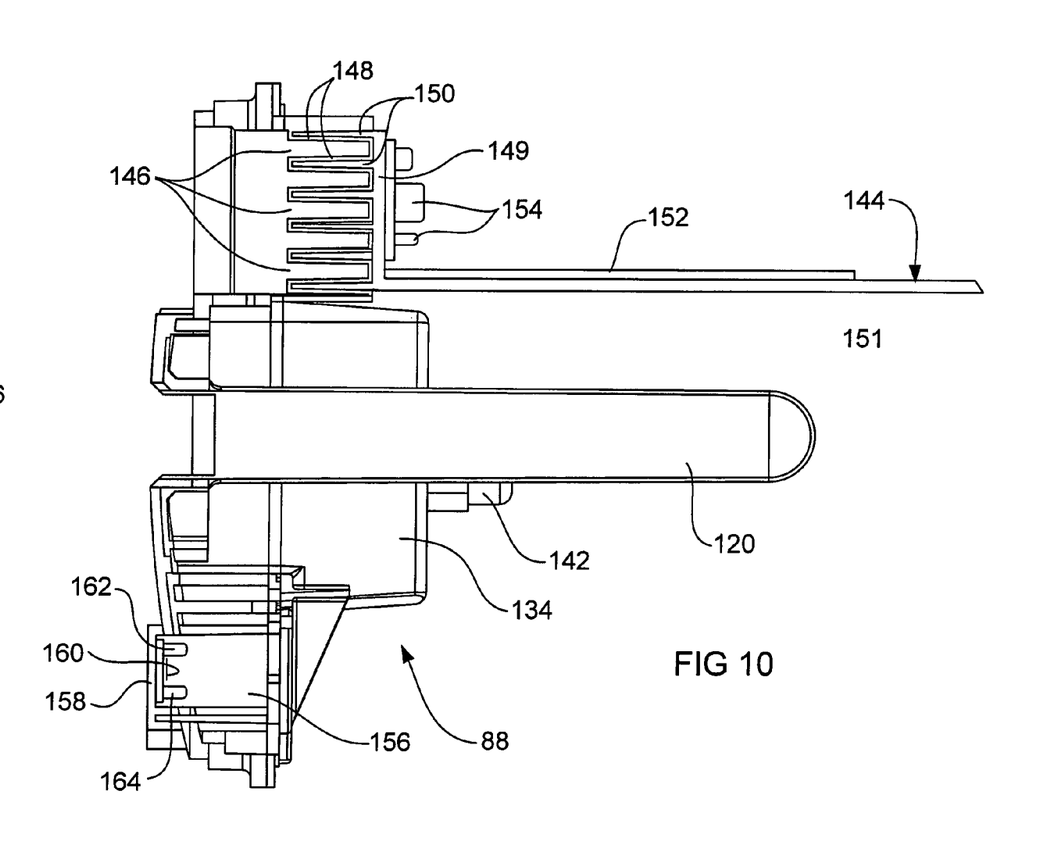
FIG. 10 is a cross section of the wall element of FIGS. 8 and 9.

The wall element 88 includes structures for receiving the tab 96 of the cathode 94 and tabs 100 of the anodes 98, thus (with reference to FIG. 9) two lower structures 138 accommodate the tabs 100 of the anodes 98 and an upper structure 140 accommodates the tab 96 of the cathode 94. Connectors (not shown) are inserted into the structures 138, 140 to make electrical connection to the tabs 96, 100 and thus to the anodes 98 and the cathode 94. The connectors are suitably sealingly fitted into the structures 138, 140 to prevent leakage of salt water 22 therefrom. Additionally to prevent leakage of salt water 22 into the control circuit chamber 37, a cover 134 (see FIGS. 3 and 10) is located over the structures 138 and 140 and sealed to the wall element 88. FIG. 9 illustrates a seal 136 for the cover 134. The cover 134 includes a gland 142 for passage of electric cabling from the connectors for the cathode tab 96 and anodes tabs 100. Given that the control circuit chamber 37 is fully enclosed, it is important that leakage of salt water 22 into it be prevented. The chamber defined by the cover 134 and wall element 88 (that is, which contains the structures 138, 140 and electrical connections to the tabs 96 and 100) is vented to atmosphere by small holes (not shown) to avoid any build up of pressure therein.

The wall element 88 also mounts a heat sink 144 for which purpose it includes a castellated-like section which defines recesses 146 (see FIG. 10) which are open to chamber 35 and over which the salt water 22 flows and wherein the castellated-like section also defines recesses 148 which are open to the control circuit chamber 37 and which receive fins 150 of the heat sink 144. The heat sink 144 is an L shaped aluminium plate having a base 149, from which the fins 150 extend, and an upstanding part 151.

The second chamber 37 includes the control circuit 36 which comprises a printed circuit board (PCB) 152 which is mounted on the upstanding part 151 of the heat sink 144. Most of the heat generating componentry 154 of the control circuit 36, including triacs and other heat generating components, is mounted on the base 149 of the heat sink 144. Thus heat that is generated within the chamber 37 by operation of the control circuit 36 is removed via the fins 150 of the heat sink 144 and the proximate flow of salt water over the recesses 146. As the control circuit chamber 37 is fully enclosed (which ensures exclusion of insects and other debris from the control circuit) it is important that the generated heat be removed to prevent overheating of the control componentry and thus possibly its premature failure.

The wall element 88 also includes a blind aperture 156 (see FIGS. 9 and 10) which opens to the chamber 37. The closed end 158 (see FIGS. 8 to 10) of the aperture 156 is a thinned region which constitutes an operative part of a flow sensor of the control circuit 36. This thinned region 158, which is exposed to the salt water 22 flow has mounted thereon a heater (for example, a resistance heater 160—see FIG. 10) and at least two temperature responsive elements (for example, thermistors 162, 164), one of which 162 is adjacent the heater 160 and the other 164 of which, being a reference temperature measuring element, is spaced away from the heater 160. The heater 160 is for transferring heat into the salt water 22 via the thinned region 158 and by determining the time for the spaced or reference temperature responsive element 164 to reach a predetermined temperature difference between it and the temperature responsive element 162 that is adjacent the heater 160 allows detection of the presence of absence of a salt water flow through the electrolysis cell 34. Alternatively the power required to maintain the sensor 162 adjacent to the heater 160 at a higher temperature (e.g. 3 degrees Celsius) compared to the reference sensor 164, provides a measure of flow, i.e. more power is required to maintain the 3 degree Celsius differential when flow is present. When a no flow condition is sensed (or a low flow below a threshold), the control circuit 36 is operative to cause the electrical power to the electrodes 94, 98 to be switched off before a damaging build up of pressure within the electrolysis cell 34 can occur. The spaced (reference) temperature responsive element 164 is also used to measure the temperature of the salt water 22 for the control circuit 36 to adjust power supplied to the electrolysis cell and thus chlorine production dependent upon detected temperatures and conductivity measurements (as described hereinbefore).

As mentioned previously, at set intervals, conductivity is measured between the two anode electrodes 98 when the electrolysis cell 34 is not involved in the chlorination process, which provides a benchmark measurement, which in turn in comparison to an electrical conductivity measurement between an anode 98 and the cathode 94 of the chlorinator 30, is used to initiate the cleaning function of the chlorinator 30. Conductivity between the anodes 98 can be used as a reference or benchmark measurement since calcium (scale) does not build up on the anode surfaces. If reduced conductivity is evidenced in this comparison, for example, if the conductivity between an anode 98 and the cathode 94 is at or below a predetermined threshold value below the benchmark conductivity between the two anodes 98, it is assumed calcium (i.e. scale) is interfering with electrode conductivity and the scrapers 102 are activated for a set number of cycles. Measurement and cleaning cycles are repeated as frequently as is necessary to ensure good conductivity is maintained. This approach minimises the wear on the solenoids 116, scrapers 102 and cathode 94.

As an alternative to basing operation of the scrapers 102 on conductivity measurements, they may be operated according to a predetermined timing schedule. For example, they could be operated for a set number of cycles after each hour of continuous or cumulative operation of the chlorinator 30. It is also within the scope of the invention that the scrapers 102 be operable according to a combination of a timing schedule and conductivity measurements.

FIG. 4 shows the rest (non-operated) position for the stem 112 of the frame 110 and scrapers 102 assembly within the cylindrical extension 120, that is, the stem 112 is maximally inserted within the cylindrical extension 120.

Excitation of one of the solenoid coils 116 drives the stem 112 outwardly of the cylindrical extension 120 and then excitation of the other solenoid coil 116 draws the stem 112 back into the cylindrical extension 120. Thus the scrapers 102 are reciprocated such that their scraping portions, that is the ribs 106, scrape across the surfaces of the cathode 94 thus removing deposited scale. A potential problem with this embodiment is that sedimentary material within the salt water 22 could lodge within the cylindrical extension 120 and build up to such a degree towards the closed end of the extension 120 as to restrict the full range of movement of the stem 112. This problem can be avoided by appropriate design of the shape of the stem 112, in particular, to shield an area around the opening from the salt water flow in such a way as to provide a relatively still sediment free volume of salt water to be drawn into the cylindrical extension 120 during operation of the solenoids 114/116.

Figure 11:
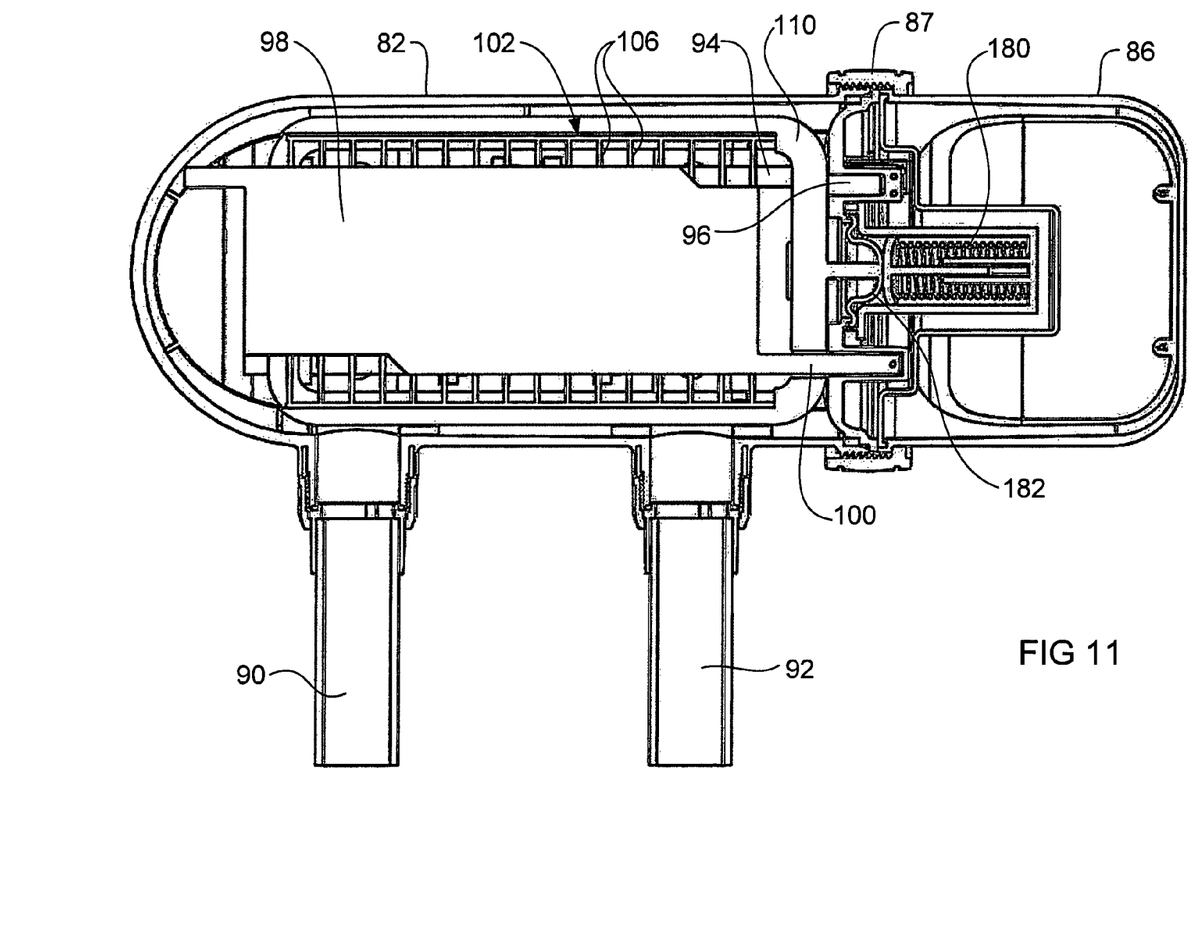
Figure 12:
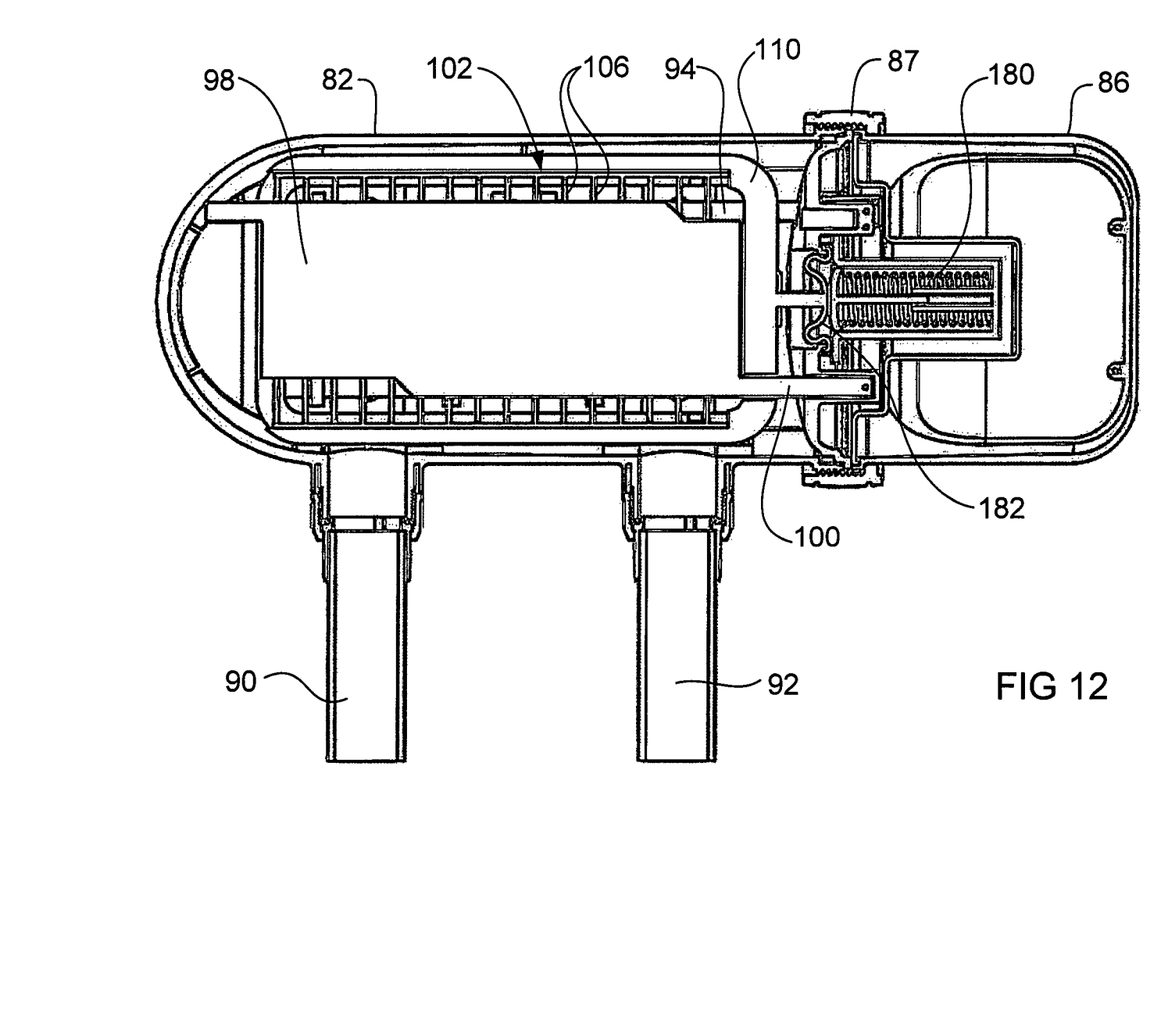

FIGS. 11 and 12 illustrate, in cross section, another embodiment of the invention which is substantially the same as the previously described embodiment, but which illustrates an alternative mechanism for reciprocating the scrapers 102. Components in this embodiment that are similar to those in the first embodiment have been accorded the same reference numeral. The following description relates mainly to the different mechanism for reciprocation of the scrapers 102.

Referring now to FIGS. 11 and 12, the mechanism for relatively moving the scrapers 102 with their scraping portions 106 contacting the surface of the cathode 94 includes a return or compression spring 180 arranged in cooperation with a diaphragm 182 attached to the rectangular frame 110 housing the scrapers 102. The return spring 180, which is housed to be separated from the electrolysis cell chamber 35, is actuated in response to changes in pressure in the first chamber 35 which defines the electrolysis cell 34 within which it is in communication via the diaphragm 182. That is, when the internal pressure within the first chamber 35, i.e. the electrolysis cell is HIGH, the return spring 180 is compressed (see FIG. 12), thereby causing the scrapers 102 to be moved towards the second or control circuit chamber 37. When the internal pressure within the first chamber 35 is LOW, the return spring 180 is enabled to expand to a relaxed condition (see FIG. 11), thereby causing the scrapers 102 to move away from the second chamber 37.

The pressure within the first chamber 35 increases when the pump 20 is switched ON, leading to HIGH pressure condition. On turning the pump 20 OFF, the pressure decreases leading to a LOW pressure condition. In accordance with this arrangement, the scrapers 102 are caused to move relative to the cathode 94 each time the pump 20 is switched ON to provide scraping of the cathode 94.

In summary and in accordance with claim 1 of the invention, with reference to the first embodiment of FIGS. 1 to 10, there is disclosed a salt water chlorinator 30 including an electrolysis cell 34 containing an anode 98 and a cathode 94 and a scraper 102 that is moveable (for example via frame 110, stem 112, cores 114 and coils 116) relative to the cathode 94 to remove deposits of electrolysis products from a surface of the cathode, wherein the scraper 102 includes scraping portions (for example ribs 106) which are positioned (for example via the mounting of scraper 102 in the frame 110) and configured (for example the curvature of the ribs 106) to be self biased against a surface of the cathode 94.

The invention described herein is susceptible to variations, modifications and/or additions other than those specifically described as would be obvious to a person skilled in the art. It is to be understood that the invention includes all such variations, modifications and/or additions which fall within the scope of the following claims.

Where the terms "comprise", "comprises", "comprised" or "comprising" are used in this specification (including the claims), they are to be interpreted as specifying the presence of the stated features, integers, steps or components referred to, but not preclude the presence of one or more other feature, integer, step, component or group thereof.

The invention claimed is:

1. A salt water chlorinator comprising:
   an electrolysis cell comprising an anode and a cathode and a scraper, at least one of the cathode or the scraper being moveable relative to the other one of the cathode or the scraper along a first direction to remove deposits of electrolysis products from the surface of the cathode,
   wherein the scraper comprises scraping portions which are positioned and configured to be self biased against the surface of the cathode,
   wherein the cathode is a plate electrode and the scraper comprises opposite sides,
   wherein the scraping portions are in the form of ribs which extend between the opposite sides transversely to the first direction across the cathode surface,
   wherein the scraping portions are formed from a resilient material and in use have a curved configuration, and
   wherein the scraper is maintained in a position relative to the surface of the cathode such that the scraping portions resiliently contact the surface of the cathode due to the curved configuration.

2. The salt water chlorinator as claimed in claim 1, wherein the ribs increase in width from one said opposite side to their centres and then decrease in width from their centres to the other said opposite side such that each rib resiliently contacts the cathode surface with substantially equal pressure along the length of the rib.

3. The salt water chlorinator as claimed in claim 1, further comprising two scrapers, each for removing deposits of electrolysis products from a respective opposite surface of the cathode, wherein each scraper comprises scraping portions which are positioned and configured to be self biased against the adjacent surface of the cathode.

4. The salt water chlorinator as claimed in claim 1, wherein the scraper is made from titanium.

5. The salt water chlorinator as claimed in claim 1, further comprising a frame for mounting and positioning the scraper relative to the cathode.

6. The salt water chlorinator as claimed in claim 1, further comprising a mechanism configured to relatively move the scraper and the cathode.

7. The salt water chlorinator as claimed in claim 6, wherein the mechanism is further configured to relatively reciprocate the scraper and the cathode.

8. The salt water chlorinator as claimed in claim 7, wherein the mechanism comprises a solenoid.

9. The salt water chlorinator as claimed in claim 6, wherein the mechanism is further configured to reciprocate the scraper.

10. The salt water chlorinator as claimed in claim 8, further comprising a housing which defines a first chamber and a second chamber, wherein the first chamber provides the electrolysis cell, and the second chamber comprises a solenoid coil of the solenoid of the mechanism, wherein a moveable core for the solenoid coil is located within the first chamber and is attached to the scraper, wherein electrical current applied to the solenoid coil magnetically influences the moveable core to move the scraper relative to the cathode.

11. The salt water chlorinator as claimed in claim 10, wherein the solenoid coil is an axial solenoid coil, and the chlorinator further comprises a second solenoid coil and a second moveable core, wherein the scraper is reciprocated by alternately activating the solenoid coils.

12. The salt water chlorinator as claimed in claim 6, wherein the mechanism comprises a compression spring which is operative to reciprocate the scraper.

13. The salt water chlorinator as claimed in claim 12, wherein the compression spring moves between a first relaxed condition and a second compressed condition in response to changes in pressure within the electrolysis cell caused by pumping and not pumping salt water through the chlorinator.

14. The salt water chlorinator as claimed in claim 1, further comprising a housing which defines a first chamber and a second chamber, wherein the first chamber provides the electrolysis cell, and a control circuit for the electrolysis cell is contained in the second chamber.

15. The salt water chlorinator as claimed in claim 14, wherein the control circuit comprises a flow sensor for sensing a flow of salt water through the electrolysis cell and which is operative to cause electric power to the electrolysis cell to be switched off when there is no flow or a low flow of salt water through the electrolysis cell, and wherein the housing comprises a wall element which divides the housing to provide the two chambers, and the wall element comprises a region constituting an operative part of the flow sensor.

16. The salt water chlorinator as claimed in claim 15, wherein the flow sensor comprises a heater and two temperature responsive elements which are spaced apart, wherein the heater is for transferring heat to salt water via the region of the wall element and the temperature responsive elements detect differentials in the power required to maintain a first sensor adjacent to the heater at a higher temperature compared to a second reference sensor spaced away from the heater.

17. The salt water chlorinator as claimed in claim 16, wherein one of the temperature responsive elements is operatively associated with temperature measurement components of the control circuit.

18. The salt water chlorinator as claimed in claim 14, wherein the control circuit comprises componentry configured to measure electrical conductivity between the anode and a second anode in the electrolysis cell to produce a benchmark conductivity reading.

19. The salt water chlorinator as claimed in claim 18, wherein the control circuit is operative, depending upon electrical conductivity measurements between the cathode and one of the anodes compared with the benchmark conductivity reading, to operate the scraper for the cathode to be cleaned when an electrical conductivity measurement varies from the benchmark conductivity reading by a predetermined threshold value.

20. The salt water chlorinator as claimed in claim 14, further comprising a mechanism configured to relatively move the scraper and the cathode, wherein the control circuit is operative for the mechanism to move the scraper according to a time based schedule.

21. The salt water chlorinator of claim 1, further comprising:
   a frame for mounting and positioning the scraper relative to the cathode; and
   wherein each of the ribs includes opposite ends that attach to the frame at the respective opposite sides of the scraper.

22. The salt water chlorinator of claim 1, wherein the scraper is made from plastic impregnated with glass fibres.

\* \* \* \* \*